(12) United States Patent
Blum

(10) Patent No.: US 6,558,018 B1
(45) Date of Patent: May 6, 2003

(54) VEHICLE LIGHT APPARATUS

(76) Inventor: Alvin S. Blum, 2350 Del Mar Pl., Fort Lauderdale, FL (US) 33301

( * ) Notice: Subject to any disclaimer, the term of this patent is extended or adjusted under 35 U.S.C. 154(b) by 0 days.

(21) Appl. No.: 10/074,820

(22) Filed: Feb. 13, 2002

(51) Int. Cl.[7] .............................. F21L 4/08; F21S 8/10; F21V 21/096
(52) U.S. Cl. ...................... 362/183; 362/249; 362/473; 362/543; 362/549; 362/398
(58) Field of Search ................. 362/227, 249, 362/251, 252, 84, 103, 473–475, 486, 543–545, 398, 549, 183

(56) References Cited

U.S. PATENT DOCUMENTS

| 3,836,759 A | * | 9/1974 | Silverman | 362/103 |
|---|---|---|---|---|
| 4,521,832 A | * | 6/1985 | Barbour | 362/103 |
| 4,812,953 A | * | 3/1989 | Ask et al. | 362/103 |
| 4,819,135 A | | 4/1989 | Padilla | 362/473 |
| 5,121,305 A | * | 6/1992 | Deed et al. | 362/473 |
| 5,245,517 A | * | 9/1993 | Fenton | 362/473 |
| 5,566,384 A | | 10/1996 | Chien | 362/84 |
| 5,572,817 A | * | 11/1996 | Chien | 40/544 |
| 5,688,038 A | * | 11/1997 | Chien | 362/103 |
| 5,823,653 A | | 10/1998 | Elam | 362/473 |

\* cited by examiner

*Primary Examiner*—Alan Cariaso
(74) *Attorney, Agent, or Firm*—Alvin S. Blum

(57) ABSTRACT

Vehicle light apparatus for removably mounting on an elongate member of a vehicle such as a stroller or bicycle has its own battery power supply mounted on a rectangular web of pliant material that has opposed long sides. The long sides are provided with fasteners so that the web may be wrapped around an elongate member of a vehicle and the two long sides then joined together to hold the apparatus in place. The battery may be rechargeable, and a built-in battery charger may be incorporated into the apparatus. Light emitters are powered by the battery and positioned to emit light from opposed sides of the member. The lights may be light emitting diodes (LEDs), electroluminescent strips (EL), or incandescent bulbs. The lights may be flashing sequencing for safety and decoration.

11 Claims, 2 Drawing Sheets

VEHICLE LIGHT APPARATUS

This invention relates to lights on vehicles, and more particularly to lights powered by rechargeable batteries that are removably attached to vehicles such as bicycles and strollers.

BACKGROUND OF THE INVENTION

It is well known to provide electric lights on vehicles for decoration and safety. The electroluminescent strip lights and light emitting diodes now available have engendered an increase in the number and variety of lights now available for vehicles. Most of these are powered by the vehicle's battery. When no vehicle battery is available, the lights may be powered by throw-away or rechargeable batteries. When a rechargeable battery is employed, the user must have a battery charger at hand by an electric power outlet, generally in a building. Various methods have been employed for mounting the light apparatus on the vehicle. When the power is from a rechargeable battery, the battery must be removed from the apparatus and installed in the charger. This may be awkward and time consuming. It may also increase the cost and complexity of the apparatus to make the battery removable and provide a separate charger.

SUMMARY OF THE INVENTION

It is accordingly an object of the invention to provide a light apparatus for a vehicle that includes its own battery. It may include its own battery charger and rechargeable battery. It is another object that the apparatus be readily applied and removed so as to be easily recharged at an electric power outlet when required, or for security. The light emitters may be light emitting diodes (LEDs), electroluminescent (EL), or incandescent lights.

These and other objects, features, and advantages of the invention will become more apparent when the detailed description is studied in conjunction with the drawings in which like elements are designated by like reference characters in the various drawing figures.

DETAILED DESCRIPTION OF PREFERRED EMBODIMENTS

Figure 1:
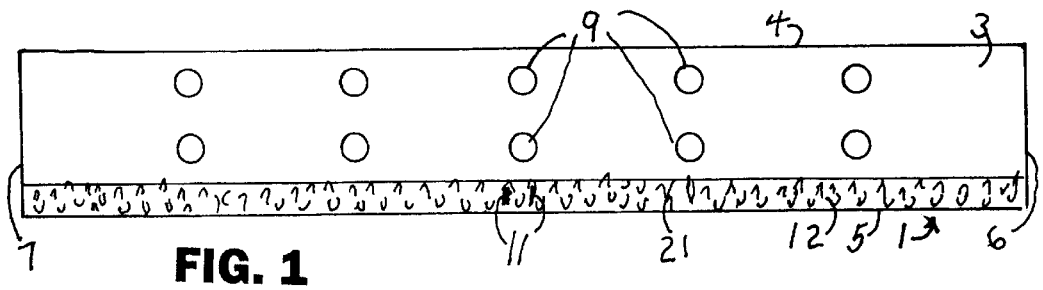
FIG. 1 is a plan view of the front face of an apparatus of the invention.
Figure 2:
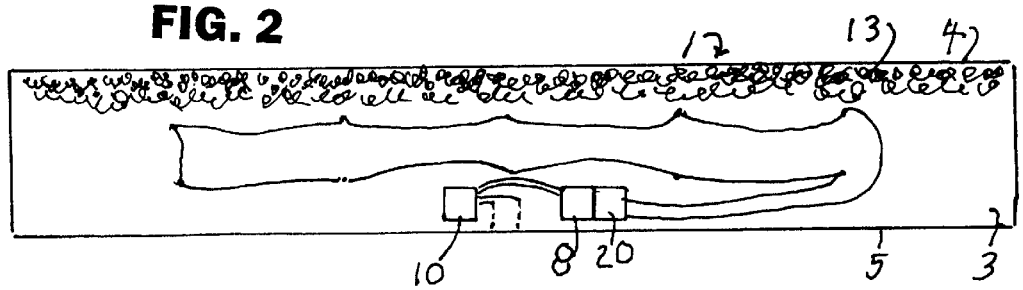
FIG. 2 is a plan view of the rear face of the apparatus of FIG. 1.
Figure 4:
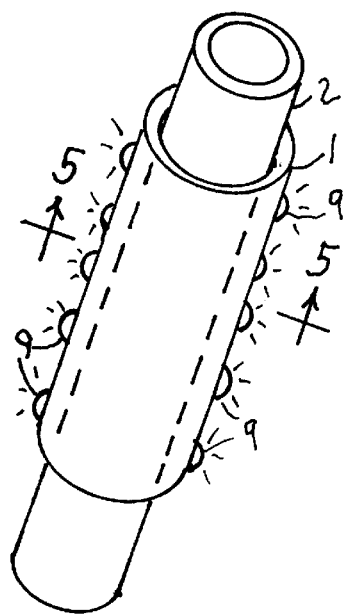
FIG. 4 is a perspective view of the apparatus of FIG. 1 in place on a tubular frame member of a vehicle.
Figure 5:
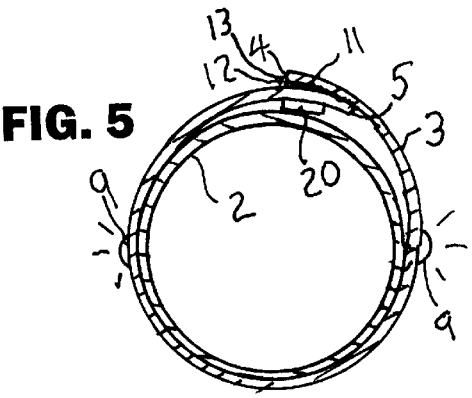
FIG. 5 is a sectional view taken on line 5—5 of FIG. 4.

Referring now to the drawing FIGS. 1–6, the electrical light apparatus 1 of the invention comprises a rectangular web 3 of pliant material such as, but not limited to, a fabric coated with a waterproofing material or a thin rubbery material that will lie flat, or be readily wrapped around an elongate member 2 of a vehicle for safety and/or decoration. The elongate member may be a tubular frame member 2 of a bicycle or a handle of a stroller, for example. The web 3 has first and second long sides, 4, 5, and first and second short sides, 6, 7. Along the first long side 4 is provided a strip of loop material 13. Along the second long side 5 is provided a strip of hook material 12 to provide adjustable means for joining the two long sides together around an elongate member with the hook and loop system that has the trade name VELCRO. Mounted on the web 3 are a rechargeable battery 8 connected to a battery charger 10. A control 20 may be a simple on/off switch or a flash sequencer well known in the art. It connects the battery to a plurality of LEDs 9. They may be arranged in two rows parallel to the long sides and so disposed that they are approximately diametrically opposed when wrapped around a tubular frame member so as to be visible from both sides of the vehicle. In order to recharge the battery 8, the battery charger 10 is connected to electrically conductive prongs 11 that are constructed for plugging into a remote stationary electric outlet. For this reason, it is desirable to make the apparatus easily removable from the elongate member. The prongs 11 are mounted on an elongate insulated bar 21 that runs parallel to the long sides. When the prongs are inserted into an electric outlet for charging the battery, the bar will hold the entire apparatus 1 against the wall. The prongs may be optionally constructed to pivot between a position parallel to the plane of the web for mounting on the vehicle, and a position orthogonal to that plane for recharging. The lights 9 may be connected in series as shown, series-parallel, or parallel as desired. As best seen in FIG. 5, when the web 3 is wrapped around the vehicle member 2, the electrical components are protectively covered by the web, with only the lights 9 exposed on diametrically opposed sides of the member. The VELCRO components 12 and 13 join together to hold the apparatus securely in place. The on/off control 20 may be actuated by pressure applied to the exterior surface of the web. Some or all of the electrical components may be embedded in the web. A protective cover 23 may be provided for the prongs when not in use.

In an alternative embodiment (not shown), the prongs and charger may be omitted, and the battery may be of the replaceable type. By use of flashing LEDs, the battery consumption may be reduced.

In an alternative embodiment (not shown), the lights may be incandescent bulbs.

Figure 7:
FIG. 7 is a plan view of the front face of another embodiment of the invention.
Figure 3:
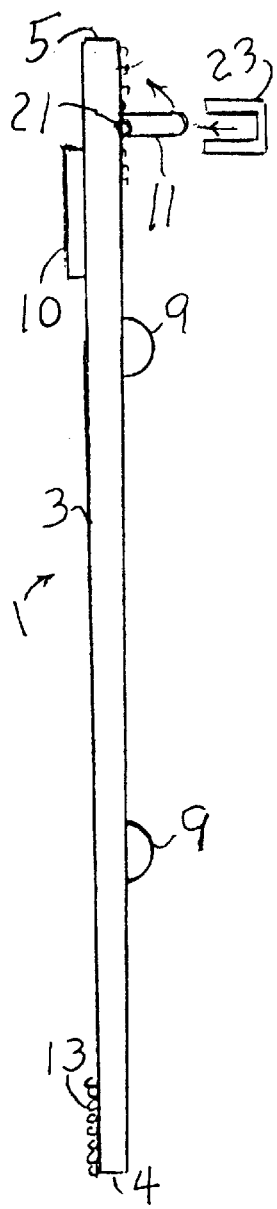
FIG. 3 is a side view of the apparatus of FIG. 1.
Figure 6:
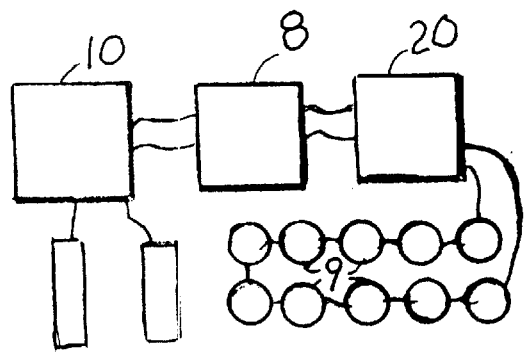
FIG. 6 is a schematic drawing of the apparatus of FIG. 1.
Figure 8:
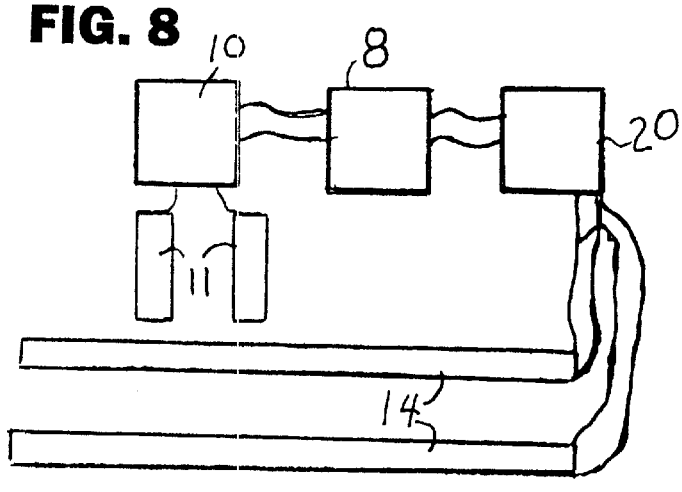
FIG. 8 is a schematic drawing of the apparatus of FIG. 7.

In an alternative embodiment shown in FIGS. 7 and 8, the lights 14 are electroluminescent strips. The means for fastening the long sides together are a magnetic strip 16 along a first long edge, and a metal strip 17 along a second long edge. Alternatively, the long sides may be joined together by other joining means such as the snaps (not shown). When the elongate member is iron, both long sides may be magnetic.

While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. Electric light apparatus for removably attaching to an elongate member of a vehicle, the apparatus comprising:
   a) a rectangular web of pliant material having two opposed long sides and two opposed short sides;
   b) a rechargeable battery mounted on the web;
   c) at least one light emitter mounted on the web and operatively connected to the battery;
   d) battery charger means mounted on the web and operatively connected to the battery for recharging the battery;

e) electrically conductive prongs mounted on the web and operatively connected to the battery charger, the prongs adapted for plugging into a remote electrical outlet; and f) fastening means on the two opposed long sides for removably joining the two long sides together around the elongate member of the vehicle.

2. The apparatus according to claim 1 in which the prongs are adapted to support the apparatus when the prongs are plugged into the electrical outlet.

3. The apparatus according to claim 2 in which the at least one light emitter comprises an electroluminescent strip.

4. The apparatus according to claim 2 in which the at least one light emitter comprises a light emitting diode.

5. The apparatus according to claim 2 in which the at least one light emitter comprises two rows of light emitting diodes disposed parallel to one another and to the long sides.

6. The apparatus according to claim 2 in which the at least one light emitter comprises an incandescent light source.

7. The apparatus according to claim 2 in which the fastening means comprises a hook and loop fastener.

8. The apparatus according to claim 2 in which the fastening means comprises snap fasteners.

9. The apparatus according to claim 2 in which the fastening means comprises magnetic fasteners.

10. The apparatus according to claim 2 in which the prongs are constructed to be moveable between a plane parallel to the web plane and a plane orthogonal to the web plane for easier insertion into the outlet.

11. The apparatus according to claim 2 further comprising a removable cover for covering the prongs when mounted on the tubular member.

* * * * *